United States Patent
Kierzyk

(10) Patent No.: US 12,445,347 B2
(45) Date of Patent: Oct. 14, 2025

(54) IDENTIFICATION OF ROOT CAUSES IN DATA PROCESSING ERRORS

(71) Applicant: DISH Wireless L.L.C., Englewood, CO (US)

(72) Inventor: Robert Kierzyk, Littleton, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/148,978

(22) Filed: Dec. 30, 2022

(65) Prior Publication Data

US 2023/0216727 A1    Jul. 6, 2023

Related U.S. Application Data

(60) Provisional application No. 63/295,799, filed on Dec. 31, 2021.

(51) Int. Cl.
*H04L 41/0631* (2022.01)
*H04L 41/16* (2022.01)

(52) U.S. Cl.
CPC .......... *H04L 41/0631* (2013.01); *H04L 41/16* (2013.01)

(58) Field of Classification Search
CPC .... H04L 41/0631; G06F 11/3684; G06N 5/04
See application file for complete search history.

(56) References Cited

U.S. PATENT DOCUMENTS

| | | | |
|---|---|---|---|
| 9,306,966 B2 * | 4/2016 | Eskin | H04L 63/1425 |
| 11,379,256 B1 * | 7/2022 | Agarwal | G06F 21/53 |
| 11,645,191 B2 * | 5/2023 | Gnaneswaran | G06N 20/00 |
| | | | 717/131 |
| 11,755,402 B1 * | 9/2023 | Chavan | G06N 20/00 |
| | | | 714/37 |
| 12,096,270 B2 * | 9/2024 | Foukas | H04W 28/0242 |
| 2007/0226546 A1 * | 9/2007 | Asthana | G06F 11/008 |
| | | | 714/E11.02 |
| 2016/0352765 A1 * | 12/2016 | Mermoud | H04L 63/1458 |
| 2017/0262360 A1 * | 9/2017 | Kochura | G06F 40/279 |
| 2018/0307481 A1 * | 10/2018 | Ganesan | G06F 16/254 |
| 2019/0012254 A1 * | 1/2019 | Gupta | G06F 11/079 |

(Continued)

OTHER PUBLICATIONS

Chakraborty et al.., "System Failure Prediction within Software 5G Core Networks using Time Series Forecasting", 2021 IEEE international Conference on Communications Workshops, Jun. 14, 2021, IEEE Publishing.*

(Continued)

*Primary Examiner* — Todd L Barker
(74) *Attorney, Agent, or Firm* — KW Law, LLP

(57) ABSTRACT

An automated process identifies root causes of defects in a 5G wireless or other data processing system. A design studio or similar tool can be used to track information about one or more particular defects. Information collected could include, for example, results of simulated or actual data processing, technical conditions identified by a system monitor, defect insertion information, defect escape information, and the like. Defect data can be analyzed by an artificial intelligence or other logic to identify root cause attributes that gave rise to the defects. These attributes, in turn, can be used to locate new defects that would have otherwise remained undetected.

14 Claims, 2 Drawing Sheets

(56) References Cited

U.S. PATENT DOCUMENTS

| | | | |
|---|---|---|---|
| 2019/0089577 A1* | 3/2019 | Misra | G06N 20/00 |
| 2019/0196938 A1* | 6/2019 | Mathen | G06F 18/295 |
| 2019/0243836 A1* | 8/2019 | Nanda | G06F 16/24568 |
| 2020/0319992 A1* | 10/2020 | Masis | G06F 11/3608 |
| 2021/0073026 A1* | 3/2021 | Myers | G06F 11/3065 |
| 2021/0263841 A1* | 8/2021 | Mo | G06F 11/3688 |
| 2021/0306235 A1* | 9/2021 | Al-Dulaimi | H04L 41/0654 |
| 2022/0035541 A1* | 2/2022 | Genereux | G06F 3/067 |
| 2022/0104403 A1* | 3/2022 | Heydari | H05K 7/20318 |
| 2022/0173965 A1* | 6/2022 | Martin | H04L 41/0813 |
| 2022/0256474 A1* | 8/2022 | Myron | H04W 52/223 |
| 2022/0302997 A1* | 9/2022 | Beeler | G06N 20/20 |
| 2023/0010417 A1* | 1/2023 | Mishra | G06F 9/546 |

OTHER PUBLICATIONS

David Gray, "Software Defect Prediction Using Static Code Mettics: Formulating a Methodology", University of Hertfordshire, Dec. 2012.*

Priovolos et al., "Using Anomaly Detection Techniques for Securing 5G Infrastructure and Applications", International Mediterranean Conference on Communications and Networking, Sep. 7, 2021, IEEE Publishing.*

Shippey et al. "Automatically idenitfying code features for software defect prediction Using AST N-grams", Information and Software Technology, Oct. 2018, Elsevier Publishing.*

Hassan et al., "Artificial Intelligence techniques over the fifth generation mobile networks: a review", Indonesian Journal of Electrical Engineeering and Computerf Science, Oct. 2021.*

Lidefldt et al, "Dynamic bandwidth control for improving 5G network resource utilization in Cloud Radio Acess Networks", Jun. 14, 2021.*

Piao et al, "Env2Vewc: Accelerating VNF Testing wiith Deep Learning", Apr. 27, 2020, ACM Publishing.*

Velasco et al, "Fault Management Based on Machine Learning" m 2019 Optical Fiber Communciatons Conference and Exhitibition Mar. 3, 2019.*

Boutaba et al., "AI drivern Closed-Loop Automation in 5G and beyond Miobile Networks", FLexNets 20211, Aug. 23, 2021, ACM Publishing.*

Chen et al., "A Perspective of O-RAN Integration with MEC, SON, and Network Slicing in the 5G Era", IEEE Network, vol. 34, Issue 6, Nov./Dec. 2020.*

* cited by examiner

IDENTIFICATION OF ROOT CAUSES IN DATA PROCESSING ERRORS

PRIORITY CLAIM

This application claims priority to U.S. Provisional Application Ser. No. 63/295,799 filed on Dec. 31, 2021, which is incorporated herein by reference.

TECHNICAL FIELD

The following discussion generally relates to software tests, such as those used to identify defects in data processing systems. More particularly, the following discussion relates to identifying the root causes of defects in large data processing systems, such as those used to implement a 5G wireless network.

BACKGROUND

Wireless data networks are becoming increasingly sophisticated. Modern fifth generation ("5G") wireless networks are now being deployed nationally and internationally to provide better coverage and additional bandwidth to mobile devices. In addition to supporting traditional mobile devices, 5G networks are intended to provide enough coverage and bandwidth to support robotics, drones, Internet-of-Things (IoT) and many other recreational, industrial, professional and personal applications.

Unlike prior data and telephone networks that relied upon proprietary designs, modern 5G networks generally comply with industry standards such as the $3^{rd}$ Generation Partnership Project (3GPP) and Open Radio Access Network ("Open RAN" or "O-RAN") standards. These standards describe interactions between the network and mobile phones and other devices associate with an operator of the network. The O-RAN model follows a virtualized model for a 5G wireless architecture in which 5G base stations ("gNBs") are implemented using separate centralized units (CUs), distributed units (DUs) and radio units (RUs). In a modern network, O-RAN CUs and DUs are often implemented using software modules executed by distributed (e.g., "cloud") computing hardware. The RUs are still implemented with physical radios, antenna, filters and the like that are present at a cellular tower or similar physical site. The bulk of the network processing, however, is handled by software executing on virtualized hardware.

Troubleshooting software bugs and other defects in large-scale data processing systems such as 5G telephone networks can be very challenging. Although networks are extensively tested, it can be difficult to isolate defects in the system. It can be even harder to isolate defects that occur under unusual operating conditions or parameters that are rarely encountered. One example of a system for performing chaos testing in a multi-environment cellular network is described in U.S. Provisional Application Ser. No. 63/226,913 entitled "Multi-Environment Cellular Network Chaos Testing" and filed on Jul. 29, 2021, which is incorporated herein by reference.

Even as defects are identified, however, it remains a challenging to identify the root causes of defects that may pop up from time to time under wildly changing circumstances so that future defects can be prevented before they occur. It is therefore desirable to create devices, systems and automated processes to identify the root causes of software and other defects in complex data processing systems, such as those used to implement 5G telephone networks. Other desirable features and characteristics will become apparent from the subsequent detailed description and the appended claims, taken in conjunction with the accompanying drawings and this background section.

BRIEF DESCRIPTION

Various embodiments relate to different automated processes, computing systems, devices and other aspects of a data processing system that identifies the root causes of defects in a data processing system. In particular, a design studio or similar tool may be used to track information about a particular defect. Information collected could include, for example, where the defect was inserted into the code base, how it was detected (e.g., peer reviews, unit tests, field tests, etc.) and the like. By identifying the process used to develop the code in which the defect was found, other defects may be located by analyzing other code that went through the same process.

In a further embodiment, a test environment for the data processing system can be used to check for a solid fix, and/or to located other areas of the software having similar conditions. This can lead to new noise factors or the like that can be inserted into chaos testing, and/or performed in parallel with chaos testing. By analyzing defect data over time, pattens can emerge that identify weak points that can be reinforced or modified. Various embodiments may automate the analysis performed herein with an artificial intelligence (AI) engine or the like.

One example embodiment provides an automated process to identify root causes of defects in data processing results emanating from a data processing system. The automated process suitably comprises: identifying a defect in the data processing results of the data processing system; storing defect data about the identified defect in a database, the defect data identifying the defect and comprising additional information associated with the defect; analyzing the database to thereby detect a pattern in the defect data based upon commonalities in the additional information associated with multiple defects; and predicting additional defects in the data processing results based upon the detected pattern.

In another embodiment, a data processing system suitably includes a processor and a non-transitory data storage having computer executable instructions stored thereon. The instructions, when executed by the processor, suitably perform an automated process to identify root causes of defects in data processing results emanating from a data processing system. The automated process suitably comprises: identifying a defect in the data processing results of the data processing system; storing defect data about the identified defect in a database, the defect data identifying the defect and comprising additional information associated with the defect; analyzing the database to thereby detect a pattern in the defect data based upon commonalities in the additional information associated with multiple defects; and predicting additional defects in the data processing results based upon the detected pattern.

Still other embodiments provide a defect analysis system to root causes of defects in data processing results emanating from a data processing system. The defect analysis system suitably comprises a system monitor configured to receive the data processing results emanating from the data processing system; a database configured to store defect data about the identified defect in a database, the defect data identifying the defect and comprising additional information associated with the defect; and a defect analysis system configured to detect a pattern in the defect data based upon commonalities in the additional information associated with multiple defects and to predict additional defects in the data processing results based upon the detected pattern.

In some embodiments, the additional information comprises technical conditions of the data processing results at the time of the defect, defect insertion information describing circumstances that allowed the defect to be created, and/or defect escape information describing circumstances that allowed the defect to escape.

Other embodiments relate to other data processing systems and automated processes substantially as described herein, and their legal equivalents.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, a design studio or similar tool can be used to track defects identified in a data processing system along with associated data relating to the defect's nature, insertion point, escape point and/or the like. This data can be subsequently analyzed to identify commonalities, which can then be used to identify additional defect points that have not previously been recognized. Such analysis can also be used to identify new test vectors or conditions to be analyzed so that additional defects can be quickly and efficiently recognized, thereby permitting early repair before the defect enters a production environment. Various embodiments perform the analysis using automated artificial intelligence tools executing on computing machinery, as desired. The analysis allows for greatly improved reliability in the data processing system, thereby preventing outages, erroneous results, inefficient operation, excessive energy consumption, excessive data storage, and/or the like.

Figure 1:
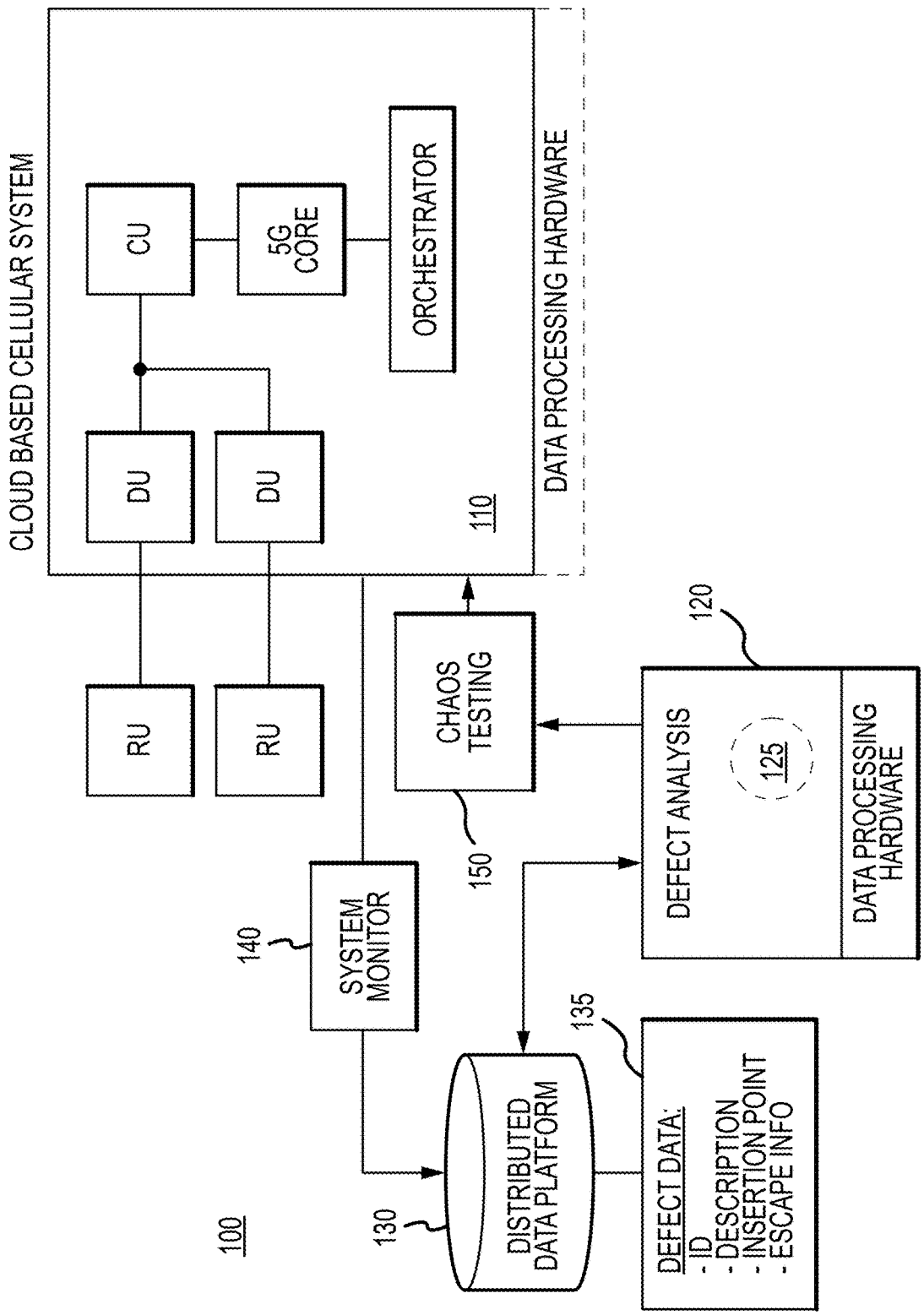
FIG. 1 illustrates an example of a data processing system to identify data processing errors.

With reference now to FIG. 1, an example system 100 to identify the root causes of software defects suitably includes a system under test 110, a system monitor 140, a distributed data platform 130 for maintaining data 135 about identified defects, and a defect analysis system 120 that performs an automated process 125 to identify root causes of defects. Defect analysis system 120 may also provide vectors or other parameters to a chaos testing system 150, if desired, although equivalent embodiments may simply provide test parameters or factors to be adjusted or otherwise considered in parallel with chaos testing, as appropriate.

The system under test 110 is illustrated in FIG. 1 as a 5G multi-environment wireless network having distributed units (DUs), centralized units (CUs), core and/or orchestrator modules in accordance with ORAN or similar standards. In various embodiments, the various modules of system 110 are virtualized modules that execute in a cloud-based data processing environment that abstracts the underlying hardware. One example of a cloud-based computing platform is the Amazon Web Services (AWS) platform provided by Amazon Inc. of Seattle, Washington, although other embodiments could use cloud service platforms provided by IBM, Microsoft, Salesforce and/or the like. Still other embodiments could use traditional computing hardware (e.g., personal computers and/or servers having physical processors, memory, input/output and the like).

Although FIG. 1 illustrates a 5G wireless network system 110 as one example of a system that can be evaluated using the techniques described herein, other embodiments may use equivalent techniques in other applications and settings, such as video streaming/media delivery, networked communications, direct broadcast satellite (DBS) communications, data processing associated with customer service centers, and/or any other applications as desired.

Chaos engineering is the discipline of testing a data processing system to evaluate the system's ability to withstand changing and unforeseen conditions. Generally speaking, it is desirable that a data processing system minimize points of error or failure. It is also desirable that such systems be fault tolerant (e.g., able to withstand defects when they occur) and that such systems deliver adequate quality of service in practice. Chaos testing can be used to evaluate the resiliency of a system against infrastructure failures, network failures, application failures and the like. To that end, chaos testing will generate conditions modelling server failures, network errors, resource errors (e.g., "disk full" conditions) and the like. By simulating expected challenges during the design phase, it is expected that more robust code will be developed to withstand such challenges after deployment.

System monitor 140 is an automated system executing on cloud or physical computing hardware (e.g., processor, memory, input/output interfaces) that identifies collects errors, bugs or similar "defects". In various embodiments, system monitor 140 provides a dashboard or similar interface that allows an operator to monitor the performance of system 110 during chaos testing, and/or during operation if desired. System monitor 140 may monitor system loads over time, numbers of modules that are deployed, instantiation of new containers for new functions of system 110, and/or other factors as appropriate. Monitor 140 may log the monitored information in data platform 130, if desired.

In some implementations, system monitor 140 provides an automated process that identifies changes in conditions caused by testing and/or operating conditions, and that identifies such changes as defects when appropriate. Defects may be automatically identified based upon parameter values, for example, and/or by recognizing metrics that deviate from expected values. Potential defects may be evaluated by a human operator, if desired, and/or simply logged in database 130 as desired.

Distributed data platform 130 is a database or the like that is capable of tracking data about particular defects. In various embodiments, platform 130 is a problem tracking tool such as the JIRA tool available from the Atlassian Corporation Plc of Sydney, Australia, although other embodiments could use any number of other tools.

The data 135 collected for each defect may vary from embodiment to embodiment. In the example of FIG. 1, data 135 for each defect includes a defect identifier, a description of the defect, an indication of the defect's insertion point (e.g., how the defect was inserted into the code base executed by system 110), and any escape information (e.g., how the defect was identified). Insertion points and escape information may be defined in any manner, e.g., by time and date, by identifiers from a code base management tool, and/or the like.

As defect data 135 is collected and stored in database 130, the collected data can be analyzed to recognize patterns. These patterns, in turn, can lead to additional analysis that can be performed to recognize additional defects that may be lurking in the code but that have not yet been recognized in the test or production environments. Such information may also be useful in process re-engineering (e.g., if a particular practice results in an undue number of defects, then the process can be modified or replaced).

In the example of FIG. 1, a defect analysis system 120 is an automated system executing on cloud or physical computing hardware (e.g., processor, memory, input/output interfaces) that can be used to recognize patterns in defect data 135. In various embodiments, defect analysis system 120 provides a front end or similar interface to database 130 that allows an operator to recognize patterns in any manner desired. Defect analysis system 120 may additionally and/or alternatively perform an automated process 125 that allows for automatic recognition of defect data. Such a process 125 may make use of artificial intelligence (AI) techniques for pattern matching, or other pattern recognition techniques as desired. Various embodiments implement defect analysis system 120 using a design studio application or the like.

Figure 2:
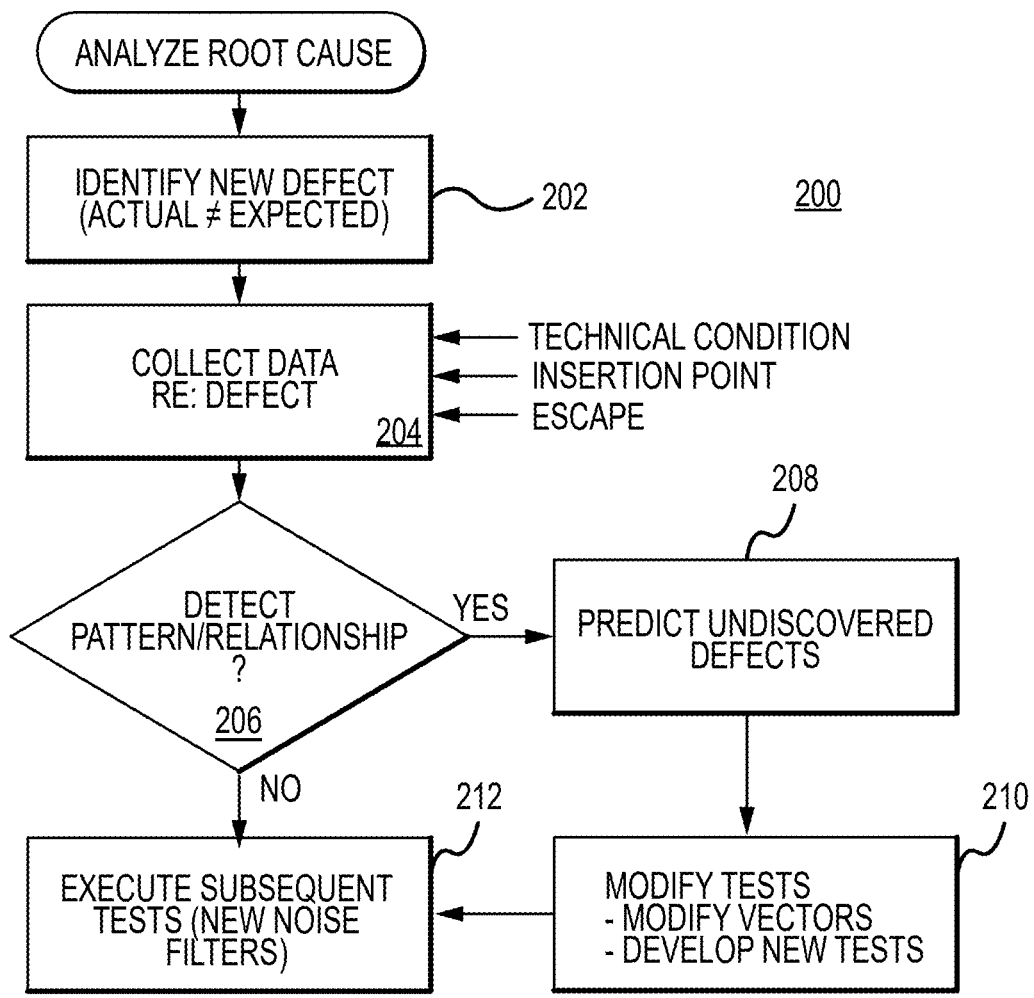
FIG. 2 is a diagram illustrating an example of an automated process performed by a data processing system to identify root causes of data processing errors.

FIG. 2 illustrates one example process 200 to analyze defect data and to identify root causes of defects. The various components of FIG. 2 may be performed by various processing modules that are executed by any of the processing elements shown in FIG. 1. In some embodiments, the various functions shown in FIG. 2 may be carried out in programmed logic (e.g., software and/or firmware) executed by any processing hardware, including cloud-based hardware supplied by Amazon, Microsoft, IBM and/or any other supplier.

The various functions shown in FIG. 2 may be performed by appropriate modules shown in FIG. 1 as an automated process. In the example process 200 illustrated in FIG. 2, new defects are identified (function 202) and data 135 is collected about the various defects (function 204) for storage in database 130 or the like. Collected data 135 can be evaluated to identify trends or patterns (functions 206, 208). Results can be reported (function 210), and test parameters can be modified and/or enhanced (function 212) to isolate and recognize additional defects, as appropriate.

In some embodiments, system monitor 140 identifies new defects (function 202) for storage in database 130 (function 204). Data processing logic 125 or the like suitably processes the data 135 from database 130 to identify patterns or relationships between defects (function 206), to analyze trends and therefore predict undiscovered defects (function 208), to report results and modify subsequent tests (function 210) and/or to perform subsequent testing (function 212) as desired. These basic components of process 200 may be differently organized into different functional modules, if desired, which may each be executed using any available data processing hardware, including cloud-based hardware. That is, any number of equivalent embodiments may implement the various functions shown in FIG. 2 using other modules, and/or may organize the analysis in any other way desired.

New defects can be recognized in any manner. As noted above, defects may be automatically identified by system monitor 140 or the like by recognizing unusual behaviors of system 110. Unusual behaviors may be recognized, for example, if an actual result from a test (and/or from a system in production) differs from an expected result. Expected results may be determined from historical data in some instances, and/or may be determined based upon predicted results given then-current conditions. Still other expected results may be based upon changes in one or more system parameters. If the number of virtual DU or CU modules currently in operation were to change unexpectedly (given then-current conditions), for example, this could be flagged as a potential defect. Other defects could be recognized from historical data such as processor utilization metrics, data storage metrics, cycle time measurements, latency and/or any other factors as desired. Other embodiments could alternatively and/or additionally use operator input when defect conditions are noticed on a dashboard or similar interface, as desired. Still other embodiments could use a separate process that monitors status information from system monitor 140 to recognize unexpected conditions, as appropriate.

As noted above, defect data 135 is recorded in database 130 (function 204). Some or all of the data 135 associated with any defect may be automatically collected by system monitor 140 or the like, for example, and/or a human operator could enter the data into database 130 based upon other information that is available. As noted above, it is useful to capture defect description, defect insertion point information, and defect escape information for further analysis.

In some embodiments, system monitor 140 simply stores all (or substantially all) of its observed data in database 135 without filtration or further attempt to identify those data values that qualify as defects. In such embodiments, other processing logic (e.g., data processing logic 125, or logic within database 130 itself) compares the observed data recorded in database 135 with expected data to identify any discrepancies that can be marked as defects. Alternatively, system monitor 140 may have access to expected values for monitored data, thereby allowing the monitor 140 to itself identify those data values that differ from expected values and are therefore considered to be defects prior to storage in database 130. Again, other embodiments may operate in any other manner.

The actual data 135 that is stored in database 130, then, may vary from embodiment to embodiment. Data that is often helpful, however, may include the actual results received from system monitor 140, as well as the expected result (e.g., received from system monitor 140 and/or processing logic 125) and/or any technical conditions of system 110. Technical conditions in this context refers to the state of system 110 that may give rise to the defect condition. This state may be determined from analysis of system logs (e.g., other data in database 130 or data collected by system monitor 140), defect insertion information (e.g., any information from system monitor 140 or other data recorded in database 130 highlighting the circumstances that allowed the defect to be created), and any defect escape information (e.g., information on the testing process that allowed the defect to escape). This information may be gleaned from manual or automated analysis of the system logs and/or other data in database 130, as desired. Recording technical conditions, insertion information and escape information for each defect allows patterns to be identified through subsequent analysis of database 130.

To that end, data 135 for each defect can be further processed to recognize any trends, patterns or relationships between defects (function 206). In the example of FIG. 2, processing logic 125 or the like compares each defect record 135 against other data recorded in database 130 to identify any other defects having similar attributes (function 206). If similar defects are identified, these can be evaluated to recognize patterns and/or relationships between defects. For example, if multiple defects occurred under similar operating conditions, and/or had similar insertion information and/or similar escape information, then this overlapping information can be useful in identifying other defects that are as-of-yet undiscovered but that may have emanated from similar situations. Artificial intelligence (AI)/machine learning (ML) logic may be very helpful in recognizing patterns or relationships between entities in database 130 that would not otherwise be apparent to a human analyst.

Information obtained about root causes can be used for any purpose. Any identified conditions can be reported, for example, for manual or automated analysis. In some implementations, identified points for suggested increased scrutiny are reported to a human and/or machine analyst. Defect analysis system 140 suitably provides an interface that allows for graphical, file based and/or other delivery of relevant information, as desired.

In various embodiments, it is desirable to identify other code that went through the same conditions as the identified defect(s) before additional defects become apparent in testing and/or production. To that end, other code that went through the same design process as the code that generated the identified defect(s) can be evaluated. Any recognized patterns in defect attributes, in turn, can be used to identify defects (function 208) for further analysis. The patterns recognized by AI or other logic in function 206, then, can be used to generate queries to database 130 or the like to potentially identify additional defects that were not previously recognized. If a particular insertion point, for example, is recognized as a repeated source of defects, then other code having a similar insertion point can be evaluated with increased scrutiny. Using the patterns or relationships identified in function 206 where defects were previously found, new attribute conditions can be predicted that are likely to yield undiscovered defects in many cases. Identifying the root causes of certain defects (e.g., based upon commonalities in technical conditions, insertion points and/or escape points) can therefore be used to identify additional defects that would have otherwise remained undetected.

Further, the patterns or relationships identified in function 208 may be automatically used (e.g., by logic 125) to generate new test conditions that probe the newly-discovered attributes in hopes of finding undiscovered defects (function 210). New database queries can be generated, for example, to identify new defects in database 130 and/or new test vectors can be generated that are applied to system 110 during subsequent testing. Test vectors may be created and/or updated to explore those attributes identified to be associated with known defects in hopes of locating additional defects having the same or similar attributes.

Further embodiments use the defect information in a test environment to build better, more effective test situations. If a defect is identified when a node sends a mal-formed address, for example, this condition could be injected into the test environment during normal chaos testing to see how the system performs. That is, defect conditions can be applied during the chaos testing to provide a more robust test of the system. Many other uses and implementations could be formulated across a wide array of alternate but equivalent environments.

Again, information obtained about root causes can be used for any purpose. In various embodiments, defect attributes can be used to identify other code that went through the same conditions as the identified defect(s) before additional defects become apparent in testing and/or production.

To that end, other code that went through the same design process as the code that generated the defect(s) can be evaluated.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process to identify root causes of defects in data processing results emanating from a data processing system, wherein the automated process comprises:
    receiving the data processing results from a plurality of different data processing components of a cloud-based 5g wireless communications network, wherein each of the different data processing components of the cloud-based 5g wireless communications network executes as a virtual component of the data processing system wherein the data processing results comprise a then-current system load and a number of virtual distributed unit (DU) modules currently in operation by the cloud-based 5g wireless communications network;
    identifying a defect in the data processing results received from one or more of the virtual components of the data processing system, wherein the defect is recognized when the number of virtual DU modules changes unexpectedly given a then-current system load of the cloud-based 5g wireless communications network;
    storing defect data about the identified defect in a database, the defect data identifying the defect and comprising additional information associated with the defect, wherein the additional information identifies at least one of the one or more virtual components of the data processing that generated the defect and comprises technical conditions of the cloud-based 5g wireless communications network at the time of the defect;
    detecting a pattern in the defect data based upon commonalities in the conditions of the cloud-based 5g wireless communications network that are associated with multiple defects; and
    predicting additional defects relating to the one or more virtual components of the cloud-based 5g wireless network based upon the detected pattern in the defect data; and
    updating test vectors based upon the detected pattern and applying the updated test vectors to the cloud-based 5G wireless communications network.

2. The automated process of claim 1 wherein the identifying comprises recognizing the defect if an observed value in the data processing results differs from an expected value.

3. The automated process of claim 1 wherein the additional information comprises system loads of the wireless communications network at the time of the defect.

4. The automated process of claim 1 wherein the additional information comprises defect insertion information describing circumstances that allowed the defect to be created.

5. The automated process of claim 1 wherein the additional information comprises defect escape information describing circumstances that allowed the defect to escape.

6. The automated process of claim 1 wherein the additional information comprises technical conditions of the data processing results at the time of the defect, defect insertion information describing circumstances that allowed the defect to be created, and defect escape information describing circumstances that allowed the defect to escape.

7. The automated process of claim 6 wherein the analyzing is performed by artificial intelligence logic.

8. The automated process of claim 1 further comprising updating test vectors based upon the detected pattern and applying the updated test vectors to the cloud-based 5G wireless network.

9. The automated process of claim 1 wherein the additional information comprises a number of virtual centralized unit (CU) modules currently in operation, and wherein the identifying comprises recognizing the defect when the number of virtual CU modules changes unexpectedly given a then-current system load of the wireless communications network.

10. A data processing system having a processor and a non-transitory data storage having instructions stored thereon that, when executed by the processor, perform an automated process that comprises:
   receiving the data processing results from a plurality of different data processing components of a cloud-based 5g wireless communications network, wherein each of the different data processing components of the cloud-based 5g wireless communications network executes as a virtual component of the data processing system, wherein the data processing results comprise a then-current system load and a number of virtual distributed unit (DU) modules currently in operation by the cloud-based 5g wireless communication network;
   identifying a defect in the data processing results received from one or more of the virtual components of the data processing system, wherein the defect is recognized when the number of virtual DU modules changes unexpectedly given a then-current system load of the cloud-based 5g wireless communications network;
   storing defect data about the identified defect in a database, the defect data identifying the defect and comprising additional information associated with the defect, wherein the additional information identifies at least one of the one or more virtual components of the data processing that generated the defect and comprises technical conditions of the cloud-based 5g wireless communications network at the time of the defect;
   analyzing the database to thereby detect a pattern in the defect data based upon commonalities in the additional information associated with multiple defects; and
   applying the detected pattern to the data processing results to thereby automatically identify additional defects relating to the one or more virtual components of the cloud-based 5g wireless network; and
   updating test vectors based upon the detected pattern and applying the updated test vectors to the cloud-based 5G wireless communications network.

11. The data processing system of claim 10 wherein the processor and non-transitory data storage are implemented using cloud-based hardware.

12. The data processing system of claim 10 wherein the automated process further comprises updating test vectors based upon the detected pattern, and applying the updated test vectors to the wireless communications network.

13. A data processing system to identify root causes of defects in data processing results emanating from a cloud-based 5g wireless communications network having a plurality of different data processing components implemented using cloud-based data processing hardware, the defect analysis system comprising:
   a system monitor configured to monitor then-current technical conditions of the cloud-based 5g wireless communications network and to receive the data processing results emanating from the cloud-based 5g wireless communications network, wherein each of the different data processing components of the cloud-based 5g wireless communications network implements a virtual component of the cloud-based 5g wireless communications network with the cloud-based data processing hardware, wherein at least some of the processing components comprise a virtual distributed unit (DUs) module, and wherein the then-current technical conditions comprise a number of virtual DU modules currently in-use by the cloud-based 5g wireless communication network;
   a database configured to store defect data about the identified defect in a database, the defect data identifying the virtual component of the cloud-based 5g wireless communications network that generated the defect and comprising additional information associated with the defect, wherein the additional information comprises technical conditions of the cloud-based 5g wireless communications network at the time of the defect, defect insertion information describing circumstances that allowed the virtual component that generated the defect to be created, and defect escape information describing circumstances that allowed the defect to escape; and
   a defect analysis system configured to recognize the defect when the number of virtual DU modules changes unexpectedly given the then-current technical conditions of the cloud-based 5g wireless communications network, to detect a pattern in the defect data based upon commonalities in the additional information associated with multiple defects and to predict additional defects in the data processing results based upon the detected pattern, wherein the defect analysis system is further configured to update test vectors based upon the detected pattern in the defect data, and to apply the updated test vectors to the virtual components of the cloud-based 5g wireless communications network to thereby identify additional defects in the cloud-based 5g wireless communications network.

14. The data processing system of claim 13 wherein the then-current technical conditions of the wireless communications network further comprise a number of virtual centralized unit (CU) modules currently in operation, and wherein the defect analysis system further recognizes the defect when the number of virtual CU modules changes unexpectedly given the then-current technical conditions of the wireless communications network.

* * * * *